(12) United States Patent
Song et al.

(10) Patent No.: US 12,061,585 B2
(45) Date of Patent: Aug. 13, 2024

(54) SYSTEMS AND METHODS OF MODELING AND QUERYING DYNAMIC TEMPORAL GRAPH ON MASSIVE PARALLEL GRAPH PROCESSING AND STORAGE ENGINE

(71) Applicant: TigerGraph, Inc., Redwood City, CA (US)

(72) Inventors: Renchu Song, Redwood City, CA (US); Yihui Chen, Santa Clara, CA (US); Brandon Jones Gunaman, Santa Clara, CA (US)

(73) Assignee: TIGERGRAPH, INC., Redwood City, CA (US)

( * ) Notice: Subject to any disclaimer, the term of this patent is extended or adjusted under 35 U.S.C. 154(b) by 35 days.

(21) Appl. No.: 17/929,138

(22) Filed: Sep. 1, 2022

(65) Prior Publication Data
US 2024/0078221 A1    Mar. 7, 2024

(51) Int. Cl.
*G06F 16/22*    (2019.01)
*G06F 16/23*    (2019.01)

(52) U.S. Cl.
CPC .......... *G06F 16/2228* (2019.01); *G06F 16/23* (2019.01)

(58) Field of Classification Search
None
See application file for complete search history.

(56) References Cited

U.S. PATENT DOCUMENTS

| | | | | |
|---|---|---|---|---|
| 10,685,063 B2 * | 6/2020 | Johnson | ............ | G06F 16/9024 |
| 10,810,210 B2 * | 10/2020 | Choudhury | ......... | G06F 16/2379 |
| 11,599,516 B1 * | 3/2023 | Sorenson | ............ | G06F 16/2282 |
| 11,704,363 B2 * | 7/2023 | Neo | ...................... | H04L 41/069 707/639 |
| 2016/0125095 A1 * | 5/2016 | Xu | ...................... | G06F 16/9024 707/740 |
| 2018/0006898 A1 * | 1/2018 | Kanza | .................. | H04L 41/142 |
| 2019/0034553 A1 * | 1/2019 | Ni | ...................... | G06F 16/9024 |
| 2022/0292543 A1 * | 9/2022 | Henderson | ......... | G06Q 30/0252 |
| 2024/0078221 A1 * | 3/2024 | Song | .................. | G06F 16/9024 |

OTHER PUBLICATIONS

Efficient snapshot retrieval over historical graph data.*
(Continued)

*Primary Examiner* — Kim T Nguyen
(74) *Attorney, Agent, or Firm* — Jonathan M. Waldman

(57) ABSTRACT

A temporal graph model is provided that can handle all six graph updates cases: vertex created; vertex deleted; vertex property updated; edge created; edge deleted; and edge property updated. A memory efficient temporal graph storage solution stores the delta change of graph evolution at each update (e.g., instead of storing the whole graph snapshot at each time). Temporal graph querying techniques are described that can determine what the graph looks like at a given time in the past and can perform any graph query on that graph's snapshot at that time as if time traveling back to that time. Also provided are event sourcing techniques of recording and tracing temporal graph updates that make the evolution of the temporal graph explainable. Further provided is a seamless integration with a massive parallel graph processing and storage engine that fully leverages the multicore and multinode cluster computation and storage resources.

14 Claims, 20 Drawing Sheets

(56) References Cited

OTHER PUBLICATIONS

Arangodb, "Time Traveling with Graph Databases: A Simplified Tutorial", https://www.arangodb.com/learn/graphs/time-traveling-graph-databases/, 16 pages.
Rossi et al., "Temporal Graph Networks for Deep Learning on Dynamic Graphs", Oct. 9, 2020, arXiv:2006.10637v3, 16 pages.
Rozemberczki et al., "PyTorch Geometric Temporal: Spatiotemporal Signal Processing with Neural Machine Learning Models," Nov. 2021, arXiv:2104.07788v3, 10 pages.
Michail, Othon, "An Introduction to Temporal Graphs: An Algorithmic Perspective", Taylor and Francis; Internet Mathematics, 12:239-280, 2016, 42 pages.
Semertzidis, Konstantinos et al., "Time Traveling in Graphs using a Graph Database", Published in the Workshop Proceedings of the EDBT/ICDT 2016 Joint Conference (Mar. 15, 2016, Bordeaux, France) on CEUR-WS.org (ISSN 1613-0073), 6 pages.

\* cited by examiner

500

600

1100

1200

1300

1400

1500

1600

1700

1800

1900

2000

2100

2200

2300

SYSTEMS AND METHODS OF MODELING AND QUERYING DYNAMIC TEMPORAL GRAPH ON MASSIVE PARALLEL GRAPH PROCESSING AND STORAGE ENGINE

BACKGROUND

A dynamic temporal graph is a graph that evolves its topology and properties along with time. It starts with an initial graph $G_{t0}=(V_{t0}, E_{t0})$, and as time elapses, it evolves as $G_{t1}=(V_{t1}, E_{t1})$, $G_{t2}=(V_{t2}, E_{t2})$ .... There are six types of topology and property changes: vertex created; vertex deleted; vertex property updated; edge created; edge deleted; and edge property updated.

Temporal graphs are well known, and there are many conventional techniques for modeling temporal graphs. One known technique models a temporal graph in a way that vertices stay unchanged, and the edges change along the time. Other known temporal graph models include: (1) static graph with temporal signal, where the topology of the graph is unchanged, but vertex properties change along with time, (2) dynamic graph with static signal, where the vertices and their properties stay unchanged, but the edge connections between the vertices change along with time, and (3) dynamic graph with temporal signal, where both the vertex properties and the edge connections between the vertices change along with time.

Some conventional temporal graph models focus on graph embedding and prediction of the graph network evolution but cannot determine what the graph looks at a given time in the past. Some conventional temporal graph models do not work for arbitrary graph data and/or have significant scalability limitations.

It is with respect to these and other considerations that the various aspects and embodiments of the present disclosure are presented.

SUMMARY

According to some embodiments, systems and methods are provided for modeling dynamic temporal graphs in a memory cost effective manner, and for querying temporal graphs on a massive parallel graph processing and storage engine. In some embodiments, a massive parallel graph processing and storage engine is leveraged to accelerate the temporal querying on the graph with the multicore and multinode cluster's full computation and storage resources.

In an embodiment, a method comprises receiving a graph update event for a temporal graph, wherein the temporal graph comprises a topology comprising at least one vertex and at least one edge, wherein each of the at least one vertex and at least one edge comprises at least one property respectively, wherein the topology and the at least one properties evolve with time; and updating the temporal graph using the graph update event, wherein updating the temporal graph comprises storing a delta change of graph evolution for each graph update event.

In an embodiment, a system comprises an event streaming injector configured to receive a graph update for a temporal graph, wherein the temporal graph comprises a topology comprising at least one vertex and at least one edge, wherein each of the at least one vertex and at least one edge comprises at least one property respectively, wherein the topology and the at least one properties evolve with time; a massive parallel graph processing engine configured to receive the graph update from the event streaming injector, process the graph update, and update the temporal graph, wherein updating the temporal graph comprises storing a delta change of graph evolution for the graph update; and a massive parallel graph storage engine configured to store an initial snapshot of a graph topology and properties of the temporal graph and delta changes at each time along as time elapses, and an event associated with each time when the temporal graph has an update.

In an embodiment, a system comprises at least one processor; and a non-transitory computer readable medium comprising instructions that, when executed by the at least one processor, cause the system to: receive a graph update event for a temporal graph, wherein the temporal graph comprises: a graph schema comprising a plurality of generic vertices, wherein each generic vertex is configured to hold historical versions of the vertex in the temporal graph; and a plurality of generic edges, wherein each generic edge is configured to hold a plurality of connections between the generic vertices; and update the temporal graph using the graph update event.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
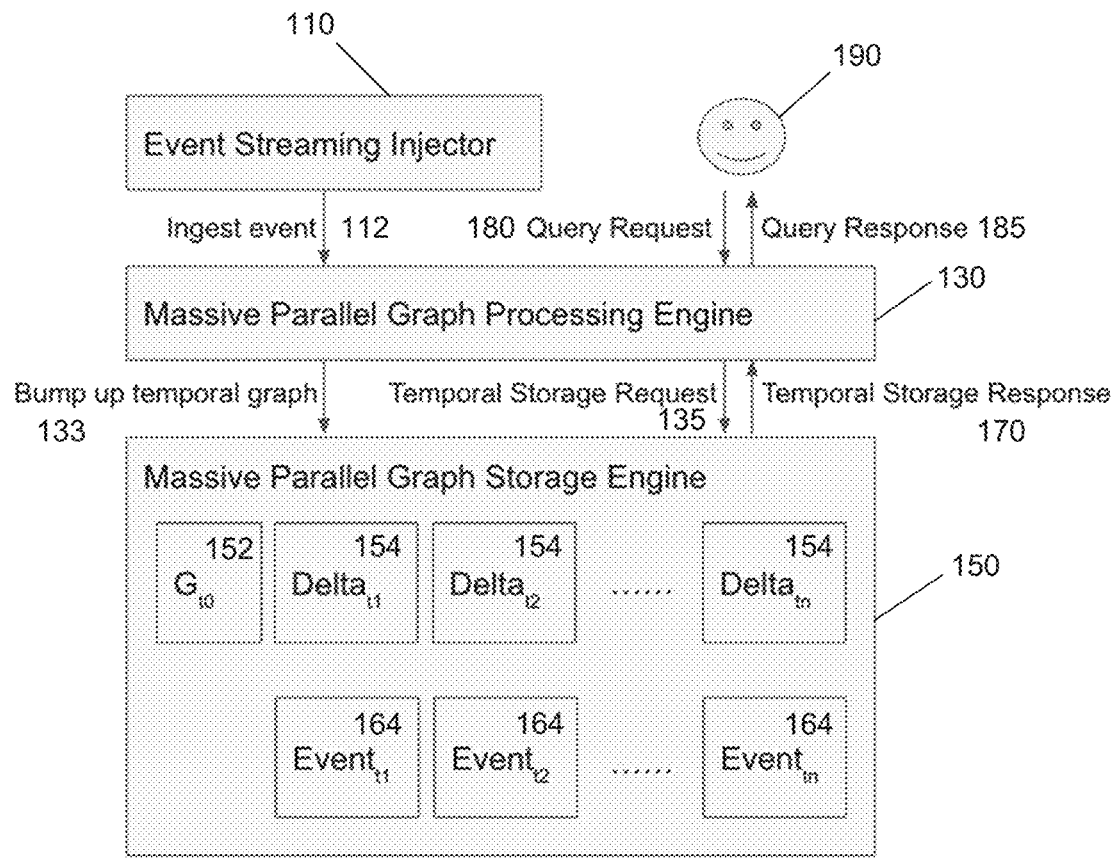
FIG. 1 is an exemplary diagram illustrating an embodiment of a system for modeling and querying a dynamic temporal graph (also referred to herein as a graph time machine)

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

As described further herein, a temporal graph model is provided that can handle all six graph updates cases: vertex created; vertex deleted; vertex property updated; edge created; edge deleted; and edge property updated. Further provided is a memory efficient temporal graph storage solution that stores the delta change of graph evolution at each update (e.g., instead of storing the whole graph snapshot at each time). Additionally, temporal graph querying techniques are described that can determine what the graph looks like at a given time in the past (e.g., a previous time) and can perform any graph query on that graph's snapshot at that time as if time traveling back to that time. Also provided are event sourcing techniques of recording and tracing temporal graph updates that make the evolution of the temporal graph explainable. Further provided is a seamless integration with a massive parallel graph processing and storage engine that fully leverages the multicore and multinode cluster computation and storage resources.

FIG. 1 is an exemplary diagram illustrating an embodiment of a system 100 for modeling and querying a dynamic temporal graph (also referred to herein as a graph time machine). The system 100 comprises an event streaming injector 110, a massive parallel graph processing engine 130, and a massive parallel graph storage engine 150. More or fewer components may be supported.

Figure 29:
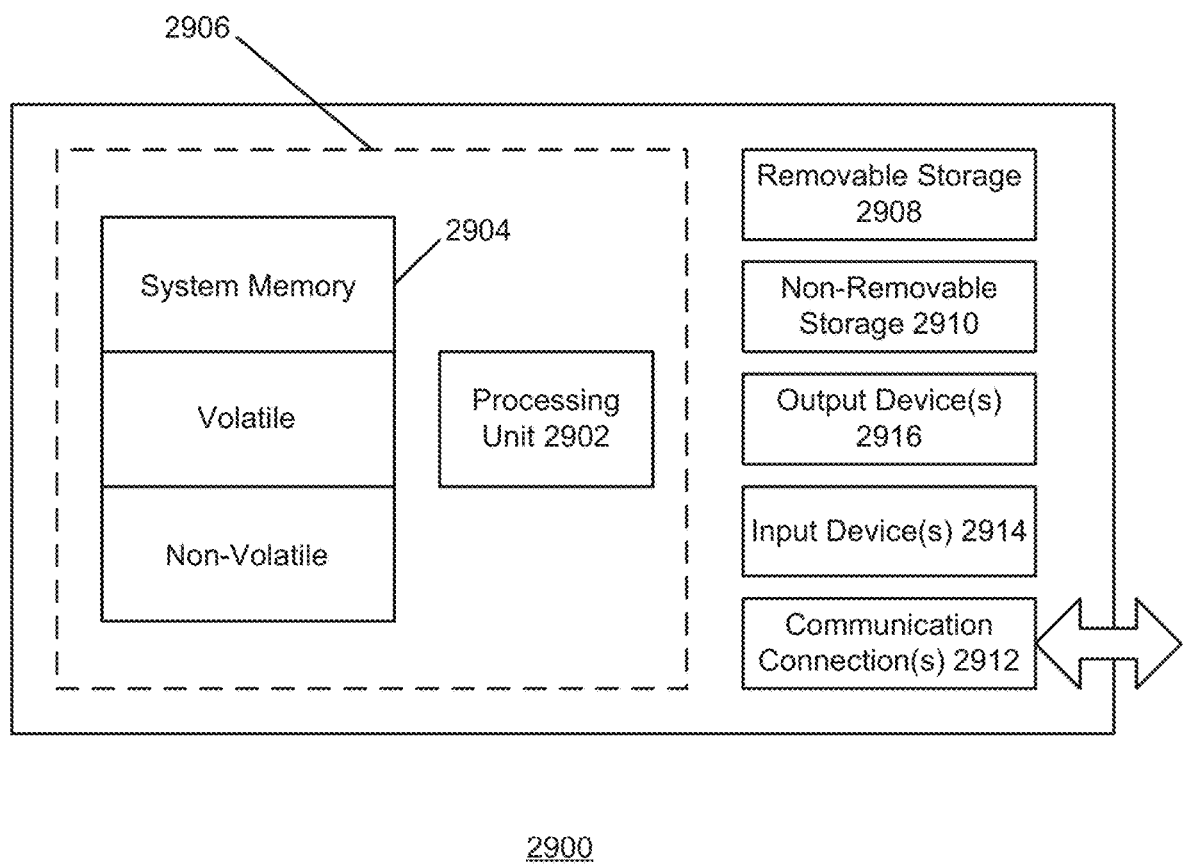
FIG. 29 shows an exemplary computing environment in which example embodiments and aspects may be implemented.

The system 100 may be implemented using a variety of computing devices such as desktop computers, laptop computers, tablets, and smartphones. Other types of computing devices may be supported. A suitable computing device is illustrated in FIG. 29 as the computing device 2900. Some or all of the components of the system 100 may be implemented together or separately by a general purpose computing device such as the computing device 2900 described with respect to FIG. 29. In addition, some or all of the components may be implemented together or separately by a cloud-based computing environment.

The event streaming injector 110 is a module that ingests events 112 (e.g., accepts or otherwise receives graph updates such as graph update streaming requests) and provides the ingested events 112 to the massive parallel graph processing engine 130 to inject or otherwise perform or process the updates.

The massive parallel graph processing engine 130 is the computation layer that handles temporal graph update and query requests. The massive parallel graph processing engine 130 provides a bump up temporal graph 133 (e.g., an updated temporal graph) to the massive parallel graph storage engine 150.

The massive parallel graph storage engine 150 stores the initial snapshot of the graph topology and properties at t0 (e.g., as $G_{t0}$ 152), the delta graph changes at each time along the time elapse (e.g., as $Delta_{t1}$, $Delta_{t2}$, ..., $Delta_{tn}$ 154), and one event associated with each time when the graph has an update (e.g., as $Event_{t1}$, $Event_{t2}$, ..., $Event_{tn}$ 164).

One or more users 190 (e.g., administrators, other computing devices or applications, etc.) may query the system 100 by providing a query request 180 to the massive parallel graph processing engine 130. The massive parallel graph processing engine 130 provides a temporal storage request 135 to the massive parallel graph storage engine 150. In response, the massive parallel graph storage engine 150 provides a temporal storage response 170 to the massive parallel graph processing engine 130. The massive parallel graph processing engine 130 provides a query response 185 as an output to the user 190.

Graph time machine modeling is described. The logical temporal graph of graph time machine is a normal property graph snapshot at given time t: $G_t = V_t \cup E_t$, where $V_t = \{V_{t\_i} | i=1 \ldots m\}$ and $E_t = \{E_{t\_j} | j=1 \ldots n\}$, where $\forall V_{t\_i}$ as $v \in V_t$, $v = <label_v, id_v, properties_v>$ and $\forall E_{t\_j}$ as $e \in E_t$, $e = <label_e, source_e, target_e, directed_e, properties_e>$, where $source_e \in \{label_v | v \in V_t\}$, $target_e \in \{label_v | v \in V_t\}$, $directed_e \in \{TRUE, FALSE\}$.

Figure 2:
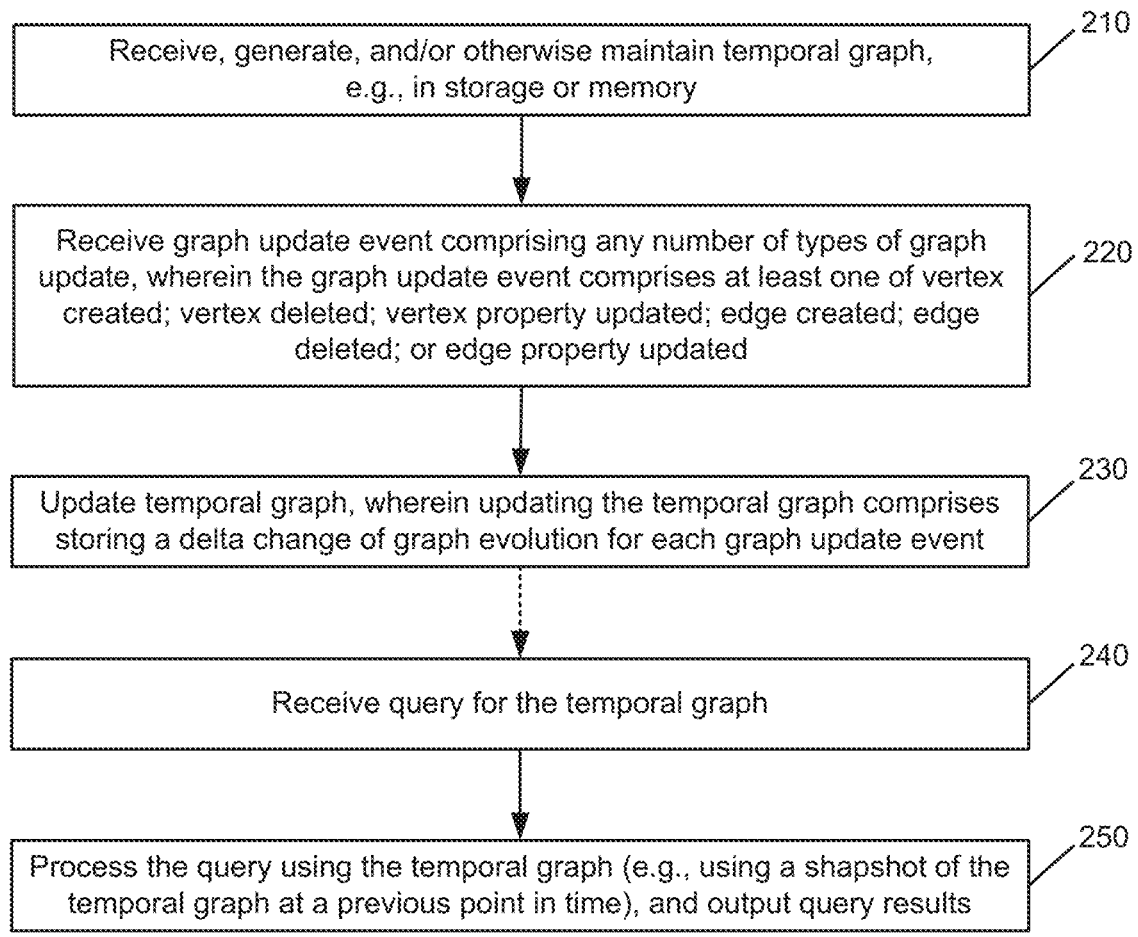
FIG. 2 is an operational flow of an embodiment of a method for modeling and querying a dynamic temporal graph.

FIG. 2 is an operational flow of an embodiment of a method 200 for modeling and querying a dynamic temporal graph. In some implementations, the method 200 may be implemented by the system 100.

At 210, a temporal graph is received, generated, and/or otherwise maintained. In some implementations, the temporal graph is received and/or maintained in storage or memory, such as those associated with a computing device.

At 220, a graph update event is received. The graph update event may comprise any number of types of graph updates. In some implementations, graph updates may comprise vertex created; vertex deleted; vertex property updated; edge created; edge deleted; and/or edge property updated.

At 230, the temporal graph is updated. In some implementations, updating the graph comprises storing a delta change of graph evolution (e.g., over time, at a point in time) for each graph update event.

At some point after the graph has been updated, a query for the temporal graph is received at 240.

At 250, the query is processed using the temporal graph to determine a result, and the query results are outputted. In some implementations, the query is processed for a previous point in time, such as by using a snapshot of the temporal graph at a previous point in time. The query results may be outputted to a computing device of a user or an application, for example, depending on the implementation.

An example of temporal graph evolution is described with respect to FIGS. 3-7. More particularly, FIGS. 3-7 are illustrations of a graph useful for describing an example of temporal graph evolution.

Figure 3:
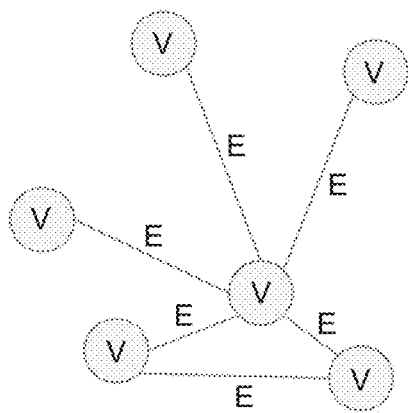
FIGS. 3-7 are illustrations of a graph useful for describing an example of temporal graph evolution.

FIG. 3 shows a graph 300 at time t0, i.e., $G_{t0}$ comprising vertices V and edges E.

Figure 4:
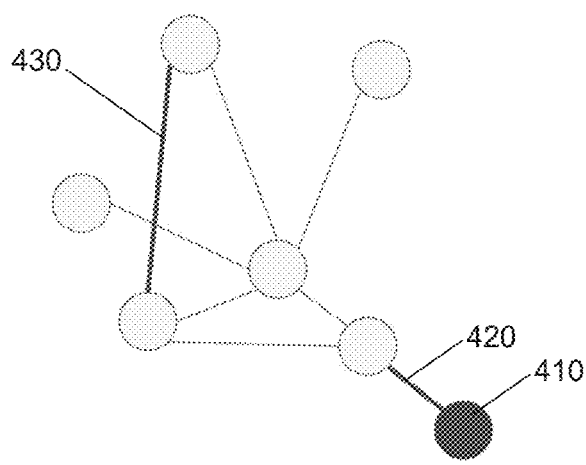

FIG. 4 shows the graph 400 at time t1, i.e., $G_{t1}$, with one new vertex 410 and two new edges 420, 430 created in the graph 400.

Figure 5:
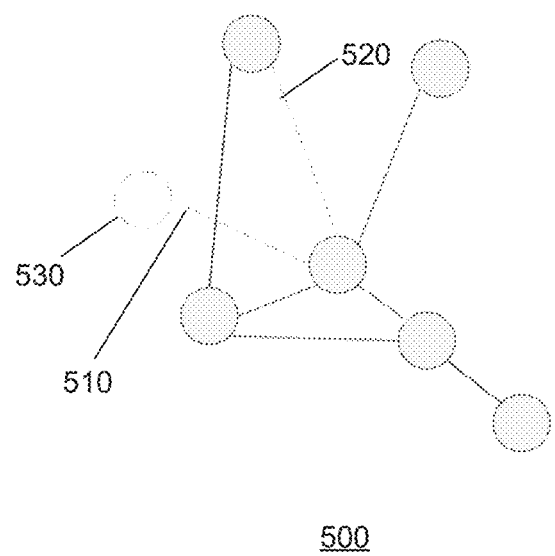

FIG. 5 shows the graph 500 at time t2, i.e., $G_{t2}$, with two edges 510, 520 and one vertex 530 deleted from the graph 500.

Figure 6:
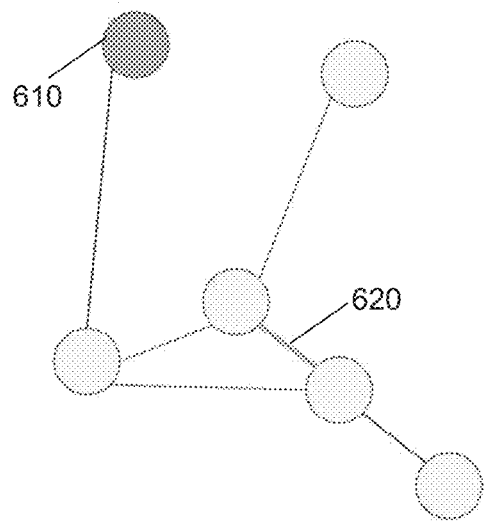

FIG. 6 shows the graph 600 at time t3, i.e., $G_{t3}$, in which the property of one vertex 610 and the property of one edge 620 get updated.

Figure 7:
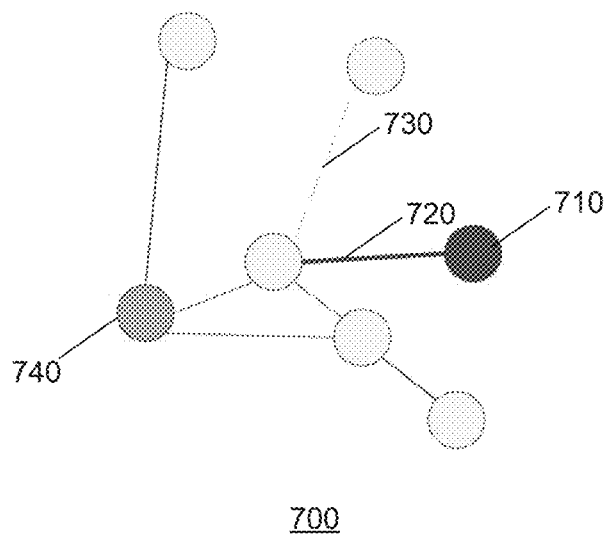

FIG. 7 shows the graph 700 at time t4, i.e., $G_{t4}$, with one vertex 710 and one edge 720 created, one edge 730 deleted, and one vertex 740 property updated.

Figure 8:
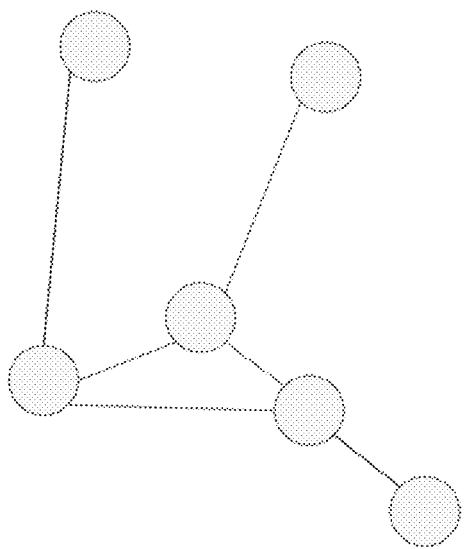
FIG. 8 is an illustration of the example graph of FIGS. 3-7 at a particular time.

The graph time machine guarantees that querying the temporal graph at any given time (e.g., in the past) will see the snapshot of that time in the past as if traveling back to that time in history. FIG. 8 is an illustration of the example graph 800 of FIGS. 3-7 at a particular time. For example, querying the above graph (e.g., of FIGS. 3-7) given any time t∈[t2, t3) is equivalent to querying on the graph 800 shown in FIG. 8.

Figure 9:
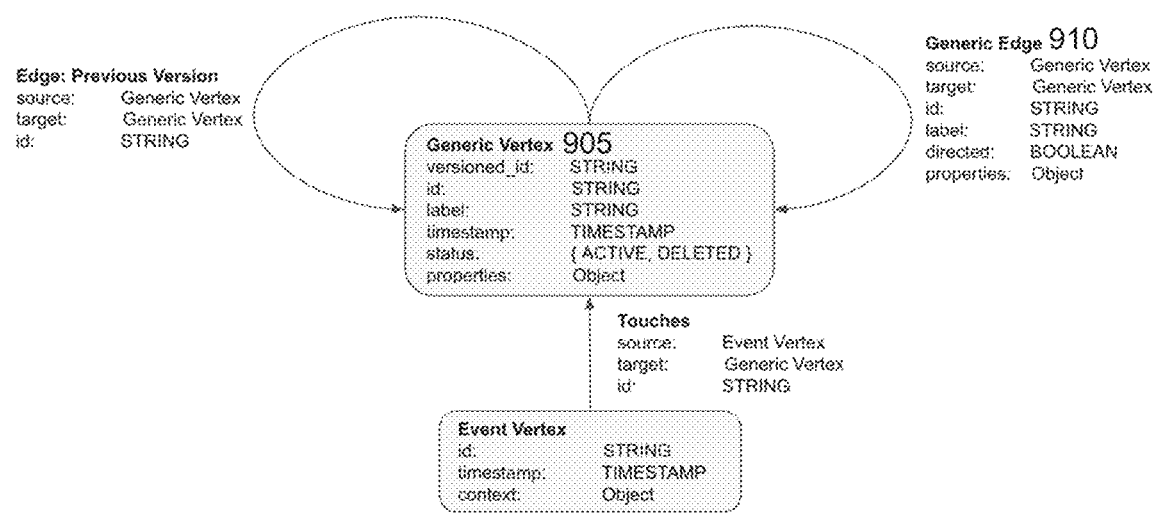
FIG. 9 is an illustration of an embodiment of a graph schema.

FIG. 9 is an illustration of an embodiment of a generic physical graph schema 900. The physical graph empowering the graph time machine follows the graph schema 900 shown in FIG. 9.

A generic vertex 905 is a vertex type that holds all vertices' historical versions. The timestamp property holds the timestamp when this specific version of the vertex is created. ID (shown as id) is the identifier of the vertex. Here the ID of the vertex will not change along with its version bump up (i.e., increase). The versioned_id is the concatenation of the vertex's timestamp and ID. Label is to categorize the vertices (in a financial graph, vertex labels could be User, BankAccount, CreditCard, etc., for example). Status holds whether the vertex still exists in the graph (ACTIVE) or is deleted (DELETED). Data is not removed from the physical graph; instead use the flag to reflect data deletion. Properties hold the properties of the vertex.

A generic edge 910 is an edge type that holds the connections between all generic vertices. Source and target annotate the endpoints of the edge. An id attribute is used to distinguish multiple edges between the same pair of source and target vertices. Similar to vertex labels, store an edge label to categorize edges (in a financial graph, edge labels could be HAS_BANK_ACCOUNT, TRANSFER_MONEY_TO, HAS_CREDIT_CARD, etc., for example). Directed is a Boolean flag identifying whether the edge is directed or undirected. Properties hold the properties of the edge.

Figure 10:
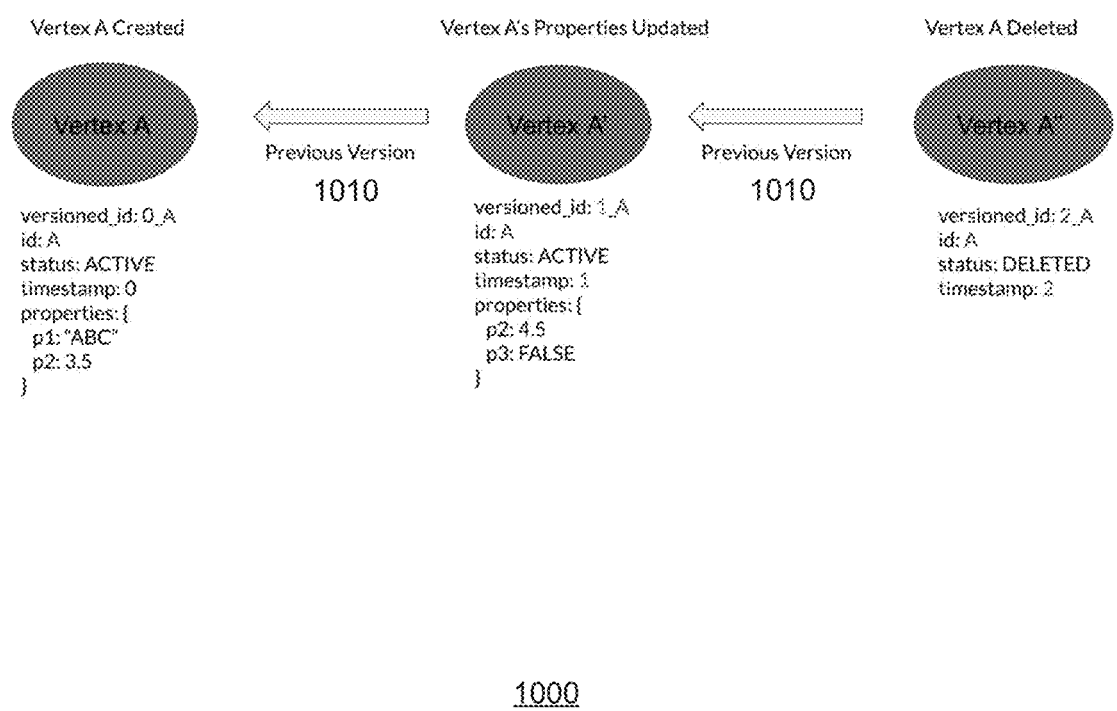
FIG. 10 is an illustration useful for describing aspects directed to previous versions.

FIG. 10 is an illustration 1000 useful for describing aspects directed to previous versions. As shown in FIG. 10, a previous version edge 1010 links two consecutive versions of a specific vertex, from the newer version to the older version. If the latest version of a specific version is known, the previous version edge 1010 can be followed to traverse back until all versions of the vertex in the history are obtained.

Figure 11:
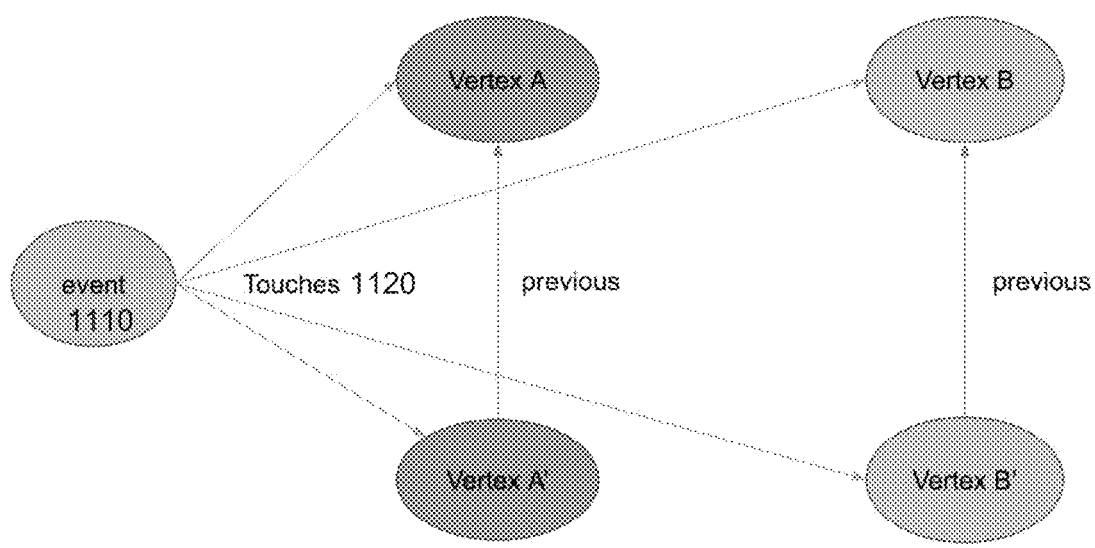
FIG. 11 is an illustration useful for describing aspects directed to an event vertex.

FIG. 11 is an illustration 1100 useful for describing aspects directed to an event vertex. As shown in FIG. 11, with respect to event vertices such as event vertex 1110 and touch edges (shown as touches 1120), each event vertex corresponds to one graph update event. A graph update event can contain any number of any type of the six types of graph updates described further herein. For example, in one graph update event, it could create two vertices and four edges, update properties of three vertices, and delete five vertices together with the edges connecting those vertices with other vertices. The event vertex 1110 is connected to the older and newer version of all the vertices (e.g., vertices A, B, and vertices A', B', respectively) that this graph update touches.

With respect to capturing temporal graph updates, seven cases of graph updates are now described.

Figure 12:
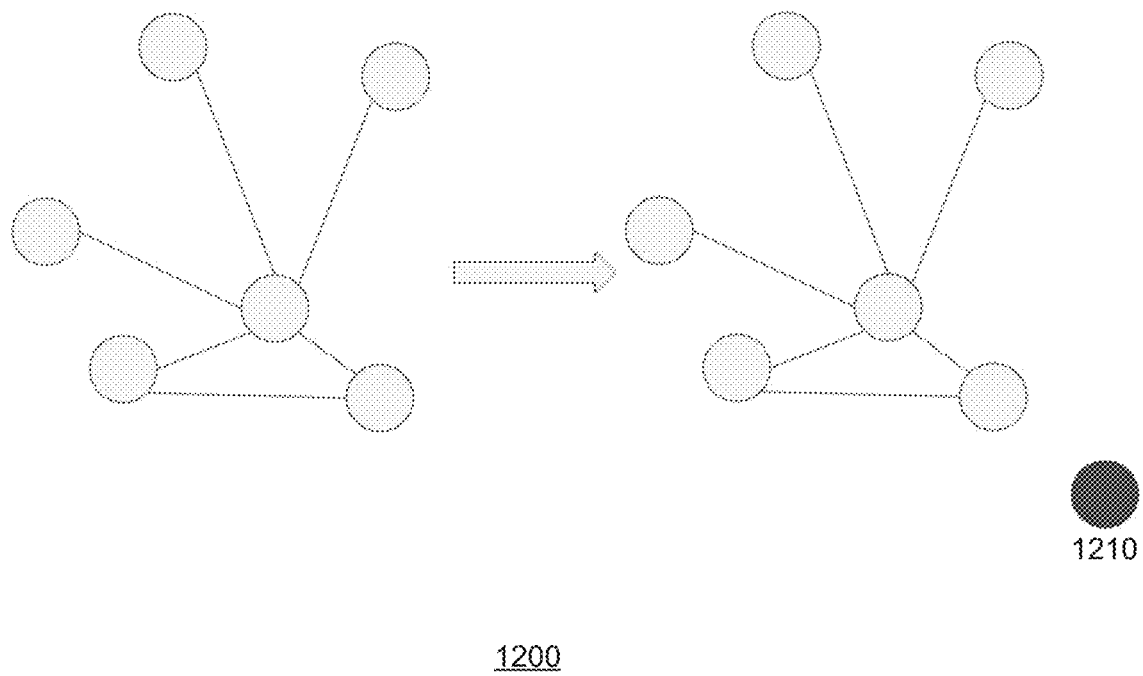
FIGS. 12 and 13 show an example logical graph change and an example physical graph change, respectively, of a temporal graph update directed to creation of a new vertex.
Figure 13:
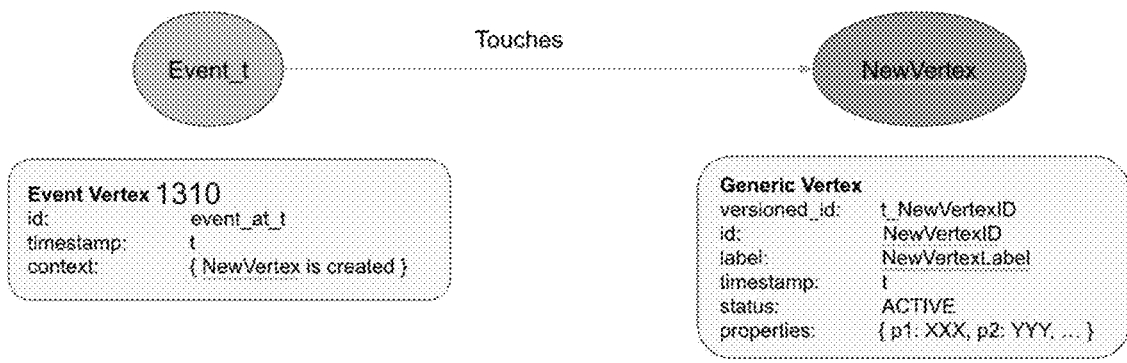

FIGS. 12 and 13 show an example logical graph change 1200 and an example physical graph change 1300, respectively, of a temporal graph update directed to creation of a new vertex 1210. FIG. 12 shows the logical graph change 1200 when a new vertex 1210 is created. Regarding the physical graph change 1300, as shown in FIG. 13, a new event vertex 1310 records the creation of this new vertex, and the first version of the vertex is also created.

Figure 14:
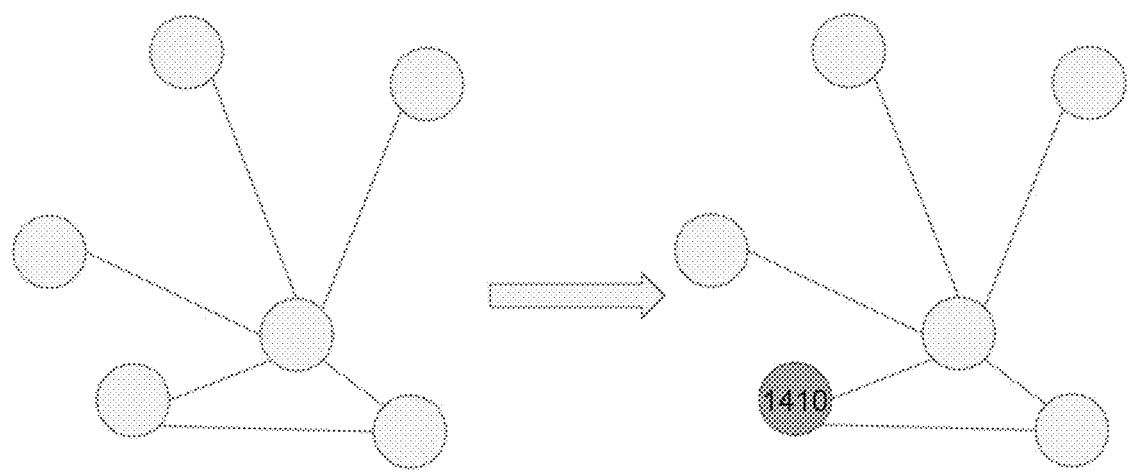
FIGS. 14 and 15 show an example logical graph change and an example physical graph change, respectively, of a temporal graph update directed to updating the properties of an existing vertex.
Figure 15:
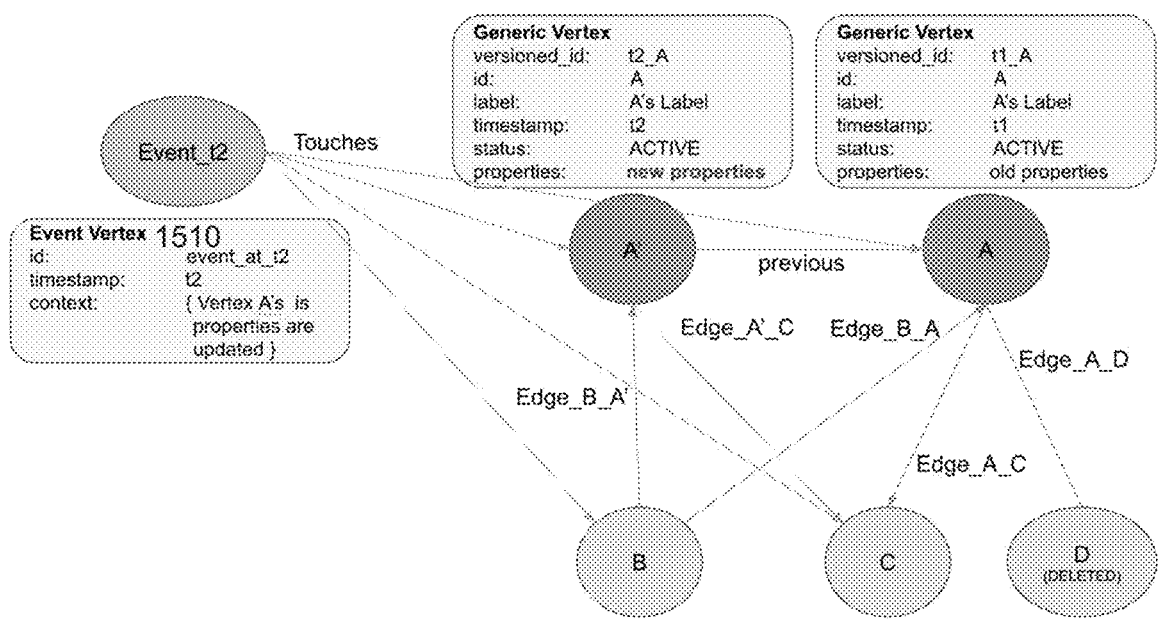

FIGS. 14 and 15 show an example logical graph change 1400 and an example physical graph change 1500, respectively, of a temporal graph update directed to updating the properties of an existing vertex 1410. FIG. 14 shows the logical graph change 1400 when an existing vertex's 1410 properties are updated. Regarding the physical graph change 1500, as shown in FIG. 15, a new version of the changed vertex is created. At the same time, the edges connecting to the older version of the vertex (both incoming and outgoing) are duplicated and the duplicated edges are connected to the newer version of the vertex. For this duplication, skip the edges connecting to vertices that are DELETED.

As further shown in FIG. 15, create an event vertex 1510 that connects to both the older version and newer version of the properties updated vertex, and also connect the event vertex 1510 to the other side of the duplicated edges, because those vertices are also impacted by this graph update.

Figure 16:
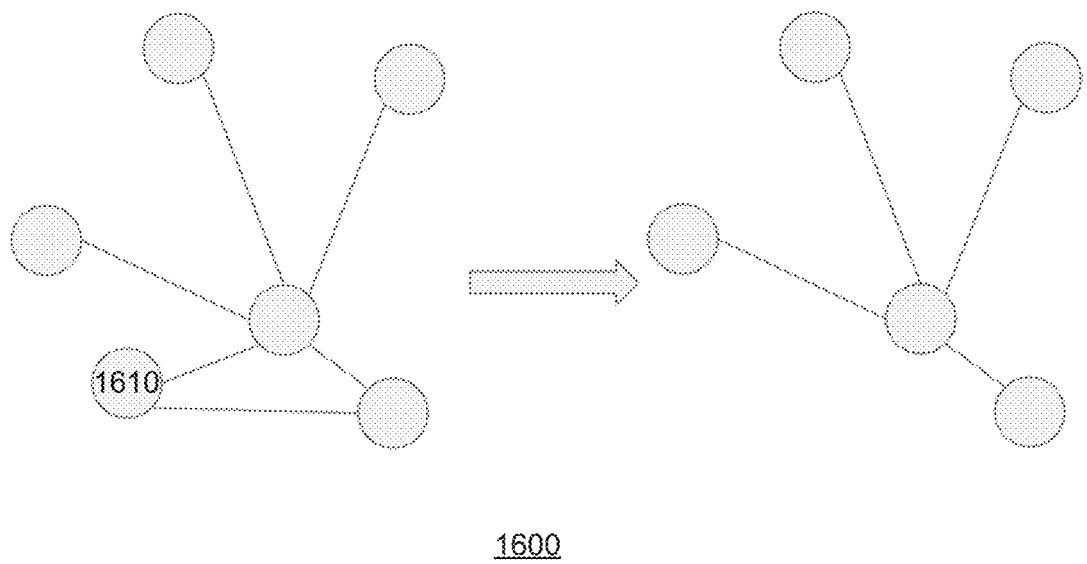
FIGS. 16 and 17 show an example logical graph change and an example physical graph change, respectively, of a temporal graph update directed to deletion of an existing vertex.
Figure 17:
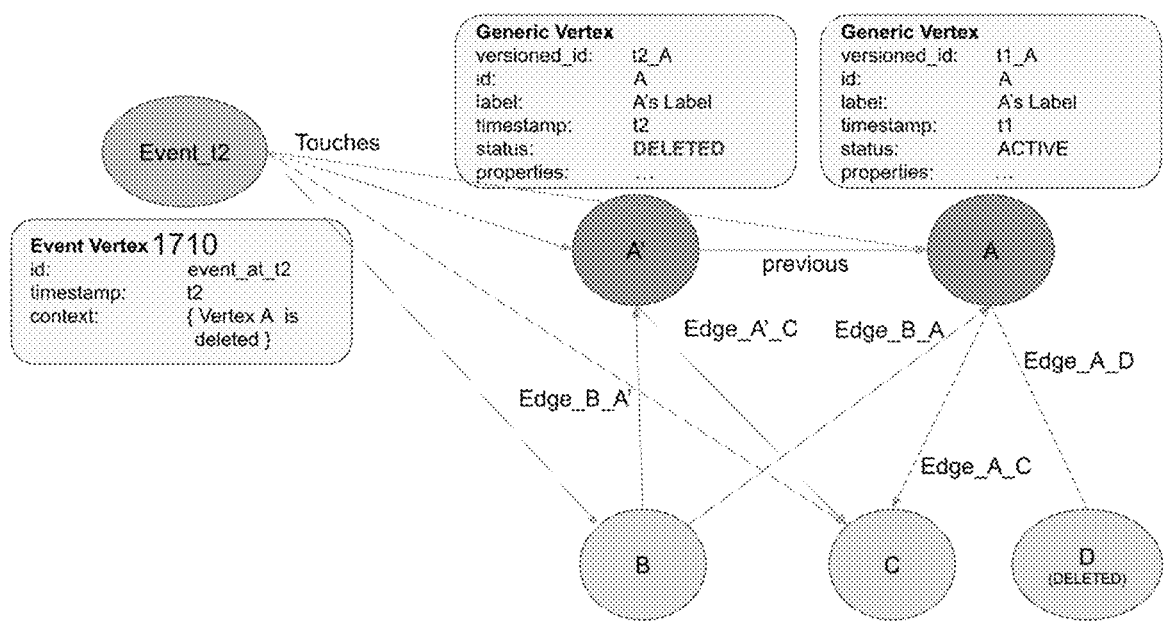

FIGS. 16 and 17 show an example logical graph change 1600 and an example physical graph change 1700, respectively, of a temporal graph update directed to deletion of an existing vertex 1610. FIG. 16 shows the logical graph change 1600 when an existing vertex 1610 is deleted. Regarding the physical graph change 1700, as shown in FIG. 17, create a new version of the changed vertex with the status DELETED. At the same time, duplicate the edges connecting to the older version of the vertex (both incoming and outgoing) and connect duplicated edges to the newer version of the vertex. For this duplication, skip the edges connecting to vertices that are DELETED. Create an event vertex 1710 that connects to both the older version and newer version of the DELETED vertex, and also connect the event vertex 1710 to the other side of the duplicated edges, because those vertices are also impacted by this graph update.

Figure 18:
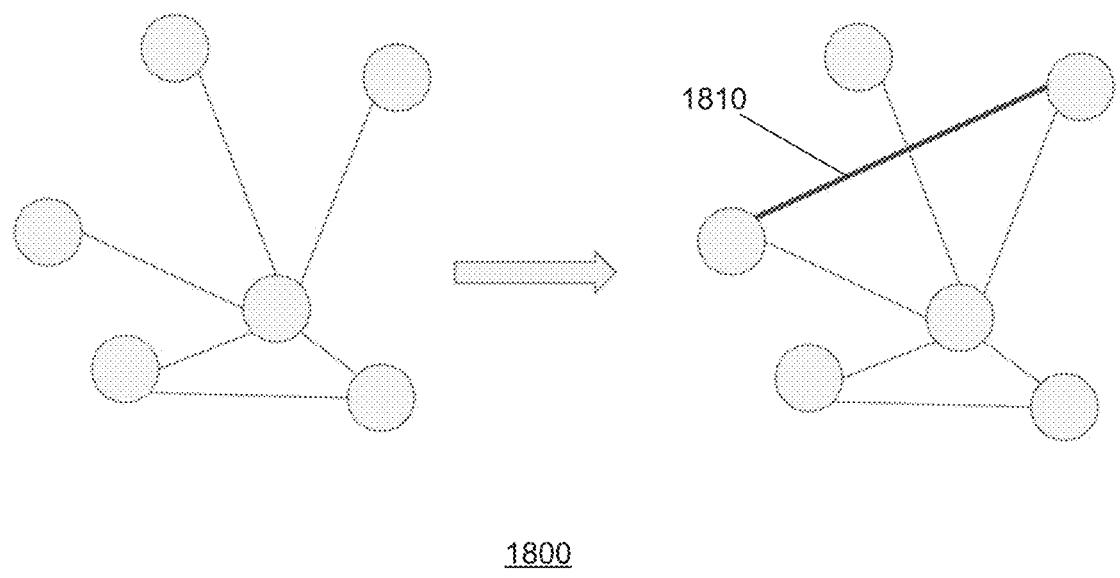
FIGS. 18 and 19 show an example logical graph change and an example physical graph change, respectively, of a temporal graph update directed to creation of a new edge between two existing vertices.
Figure 19:
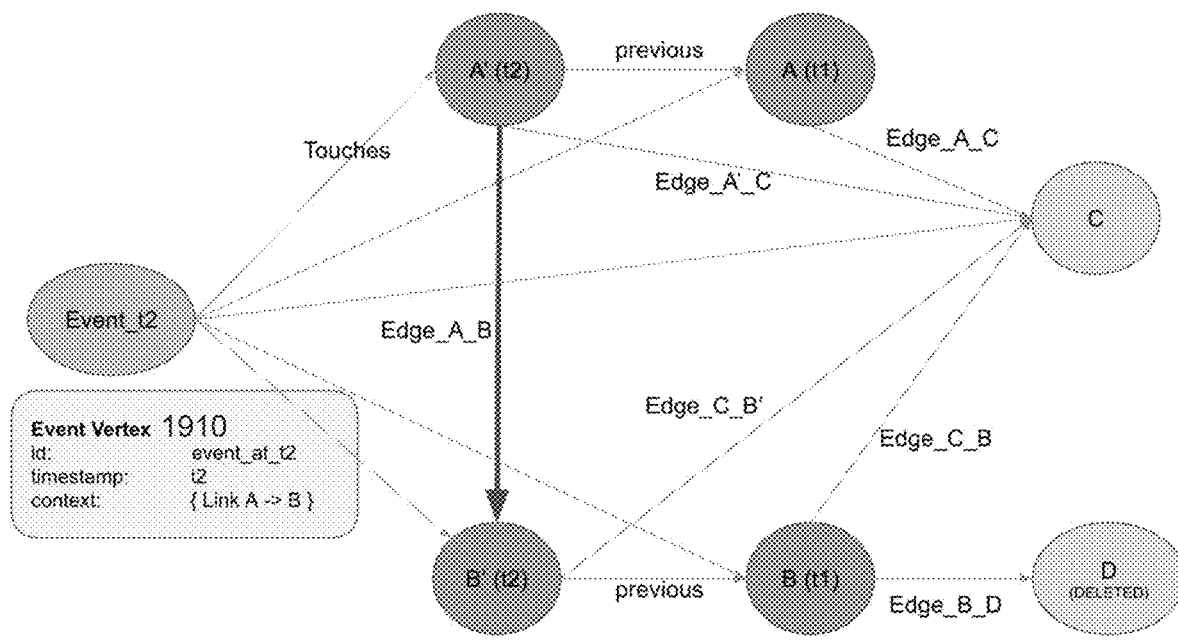

FIGS. 18 and 19 show an example logical graph change 1800 and an example physical graph change 1900, respectively, of a temporal graph update directed to creation of a new edge 1810 between two existing vertices. FIG. 18 shows the logical graph change 1800 when a new edge 1810 is created between two existing vertices. Regarding the physical graph change 1900, as shown in FIG. 19, create a new version of the source and target of the newly created edge. At the same time, duplicate the edges connecting to the older version of the source vertex and target vertex (both incoming and outgoing) and connect duplicated edges to the newer version of the two vertices. For this duplication, skip the edges connecting to vertices that are DELETED. Create an event vertex 1910 that connects to both the older version and newer version of the source and target vertices, and also connect the event vertex 1910 to the other side of the duplicated edges, because those vertices are also impacted by this graph update.

Figure 20:
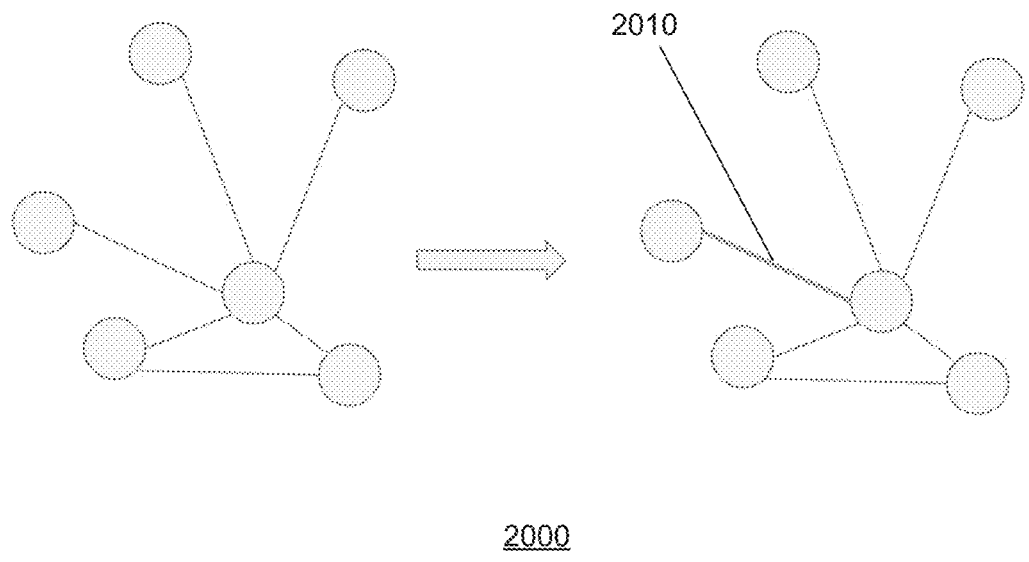
FIGS. 20 and 21 show an example logical graph change and an example physical graph change, respectively, of a temporal graph update directed to updating the properties of an existing edge.
Figure 21:
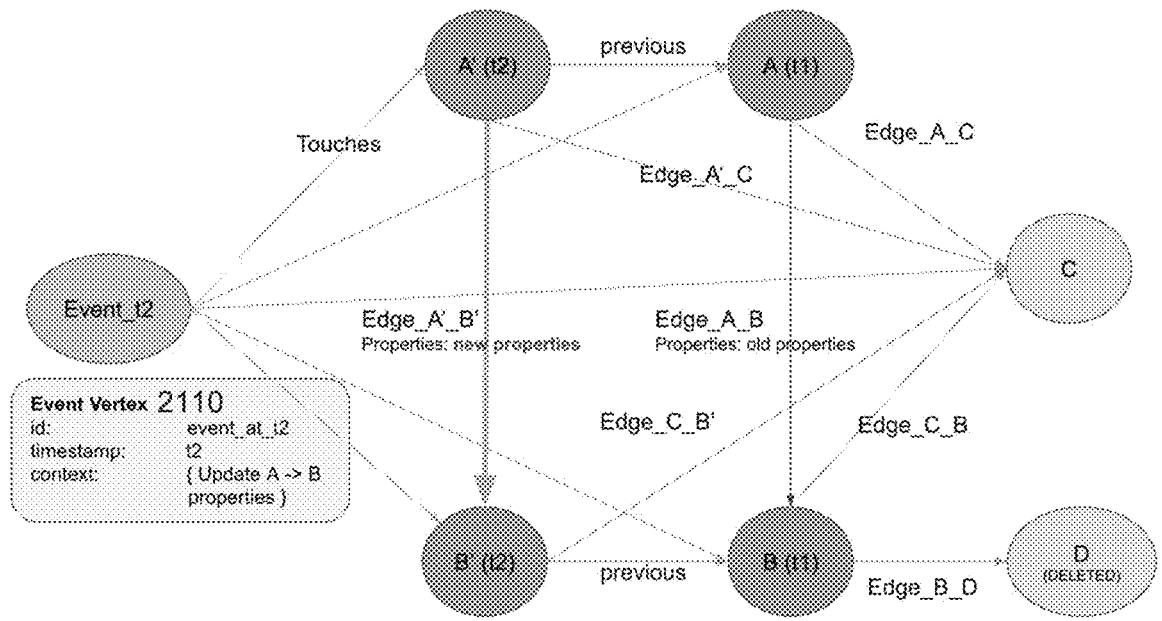

FIGS. 20 and 21 show an example logical graph change 2000 and an example physical graph change 2100, respectively, of a temporal graph update directed to updating the properties of an existing edge 2010. FIG. 20 shows the logical graph change 2000 when an existing edge's 2010 properties are updated. Regarding the physical graph change 2100, as shown in FIG. 21, create a new version of the source and target of the properties updated edge. At the same time, duplicate the edges connecting to the older version of the source vertex and target vertex (both incoming and outgoing) and connect duplicated edges to the newer version of the two vertices. For this duplication, skip the edges connecting to vertices that are DELETED. Create an event vertex 2110 that connects to both the older version and newer version of the source and target vertices, and also connect the event vertex 2110 to the other side of the duplicated edges, because those vertices are also impacted by this graph update.

Figure 22:
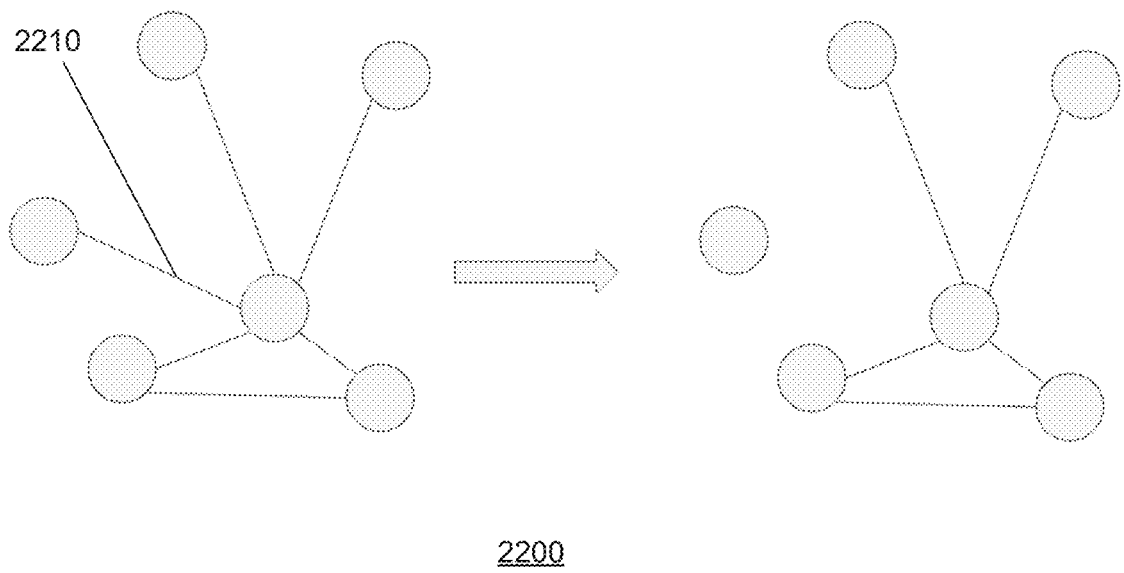
FIGS. 22 and 23 show an example logical graph change and an example physical graph change, respectively, of a temporal graph update directed to deletion of an existing edge.
Figure 23:
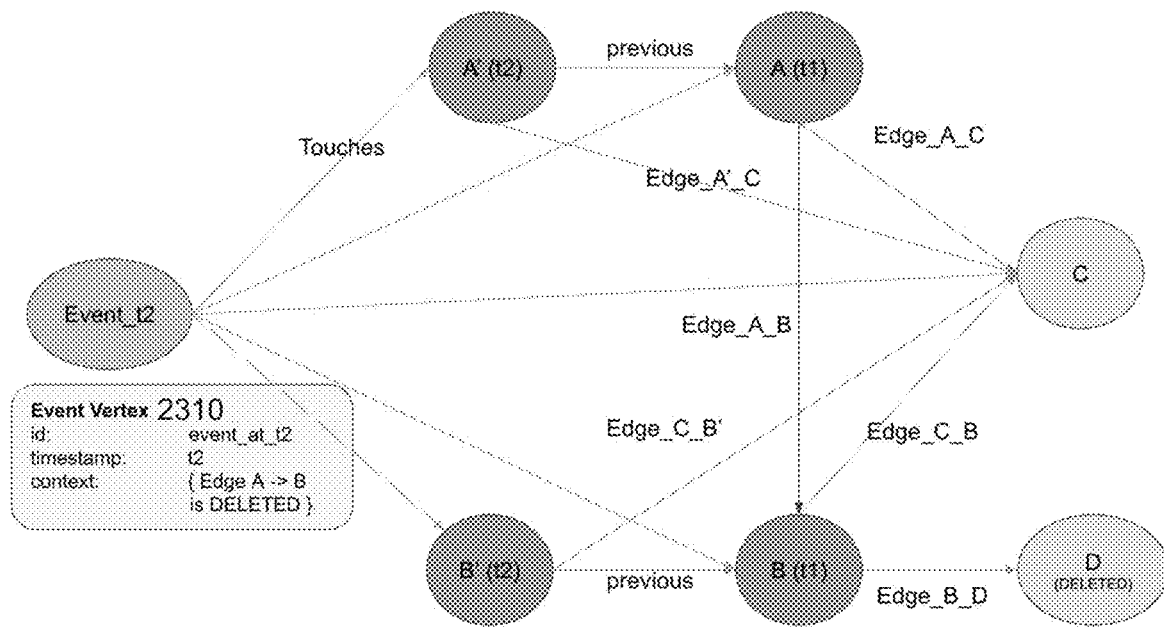

FIGS. 22 and 23 show an example logical graph change 2200 and an example physical graph change 2300, respectively, of a temporal graph update directed to deletion of an existing edge 2210. FIG. 22 shows the logical graph change 2200 when an existing edge 2210 is deleted. Regarding the physical graph change 2300, as shown in FIG. 23, create a new version of the source and target of the deleted edge. At the same time, duplicate the edges connecting to the older version of the source vertex and target vertex (both incoming and outgoing) and connect duplicated edges to the newer version of the two vertices. For this duplication, skip the edges connecting to vertices that are DELETED. Create an event vertex 2310 that connects to both the older version and newer version of the source and target vertices, and also connect the event vertex 2310 to the other side of the duplicated edges, because those vertices are also impacted by this graph update.

In the case where a combination of multiple previous cases (e.g., described above with respect to FIGS. 12-23) happen in one event, the logical graph change may be a union of the above six cases. It is a generic temporal graph topology and properties update.

Figure 24:
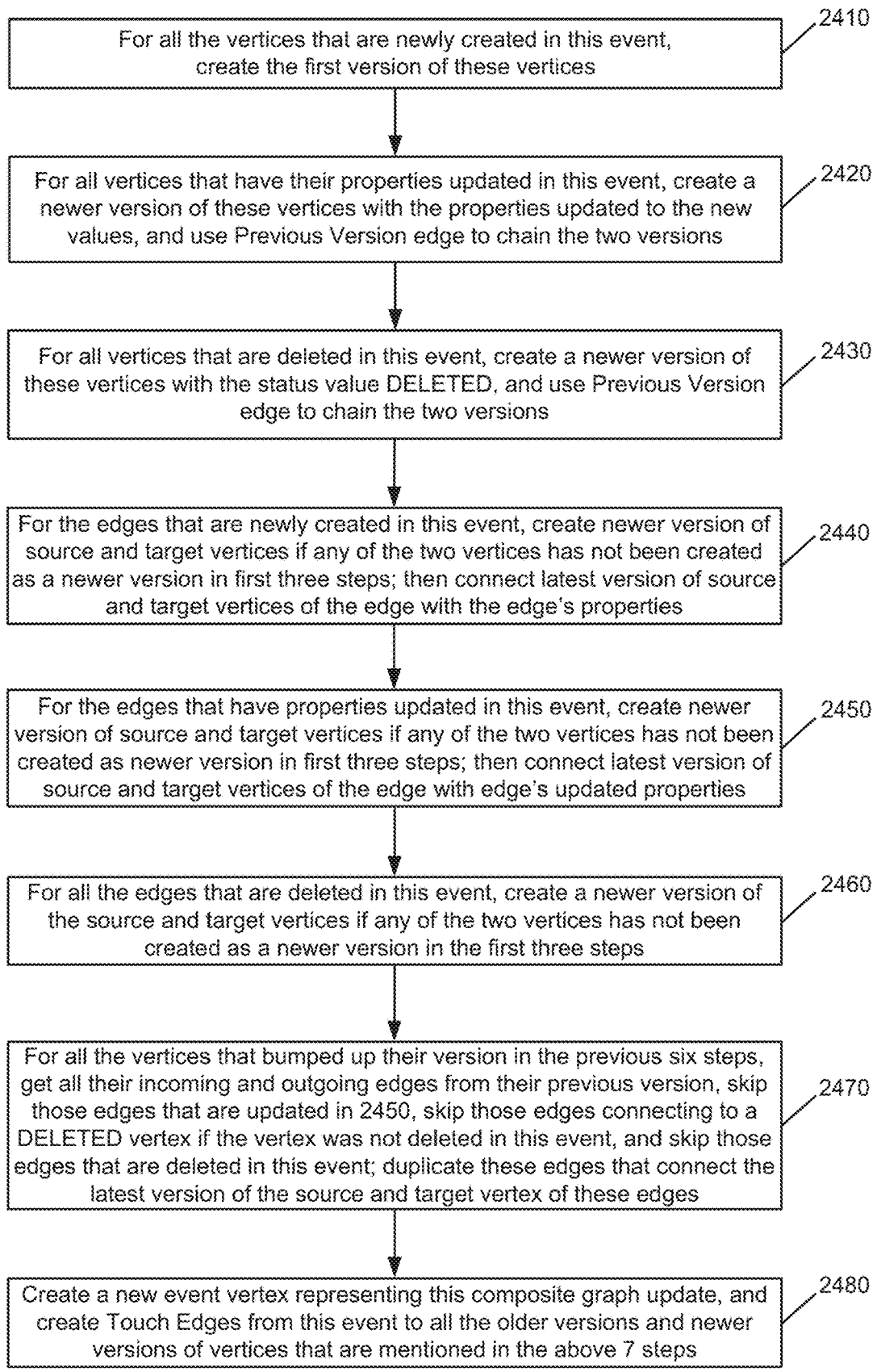
FIG. 24 is an operational flow of a method of a physical graph change of a temporal graph directed to a combination of update events.

FIG. 24 is an operational flow of a method 2400 of a physical graph change of a temporal graph directed to a combination of update events. In some implementations, the method 2400 may be implemented by the system 100.

At step 2410, for all the vertices that are newly created in this event, create the first version of these vertices.

At step 2420, for all vertices that have their properties updated in this event, create a newer version of these vertices with the properties updated to the new values, and use Previous Version edge to chain the two versions.

At 2430, for all vertices that are deleted in this event, create a newer version of these vertices with the status value DELETED, and use Previous Version edge to chain the two versions.

At 2440, for all the edges that are newly created in this event, create a newer version of the source and target vertices if any of the two vertices has not been created as a newer version in the first three steps. Then connect the latest version of the source and target vertices of the edge with the edge's properties.

At 2450, for all the edges that have their properties updated in this event, create a newer version of the source and target vertices if any of the two vertices has not been created as a newer version in the first three steps. Then connect the latest version of the source and target vertices of the edge with the edge's updated properties.

At 2460, for all the edges that are deleted in this event, create a newer version of the source and target vertices if any of the two vertices has not been created as a newer version in the first three steps.

At 2470, for all the vertices that bumped up their version in the above six steps, get all their incoming and outgoing edges from their previous version, skip those edges that are updated in step 2450, skip those edges connecting to a DELETED vertex if the vertex was not deleted in this event, and skip those edges that are deleted in this event. Duplicate these edges that connect the latest version of the source and target vertex of these edges.

At 2480, create a new event vertex representing this composite graph update, and create Touch Edges from this event to all the older versions and newer versions of vertices that are mentioned in the above seven steps.

With respect to the seven graph update cases described above, it is noted that the first six cases are just special cases of the seventh. In some implementations, it is just needed to implement the seventh graph update case, and apply it to the above first six cases as well.

Graph time machine-querying is described.

Any graph query can be modeled as retrieving a subgraph of the whole graph. In graph time machine's perspective, any graph query can be modeled as retrieving a subgraph of the whole graph's snapshot of a given timestamp in the history.

Each generic vertex in the graph time machine has its own history of evolution. The evolution of the generic edges is absorbed by the evolution of the source and target vertex of that edge. Therefore, the graph time machine query is equivalent to querying the latest version of vertices before or at the given timestamp, then querying the edges between these vertices.

Figure 25:
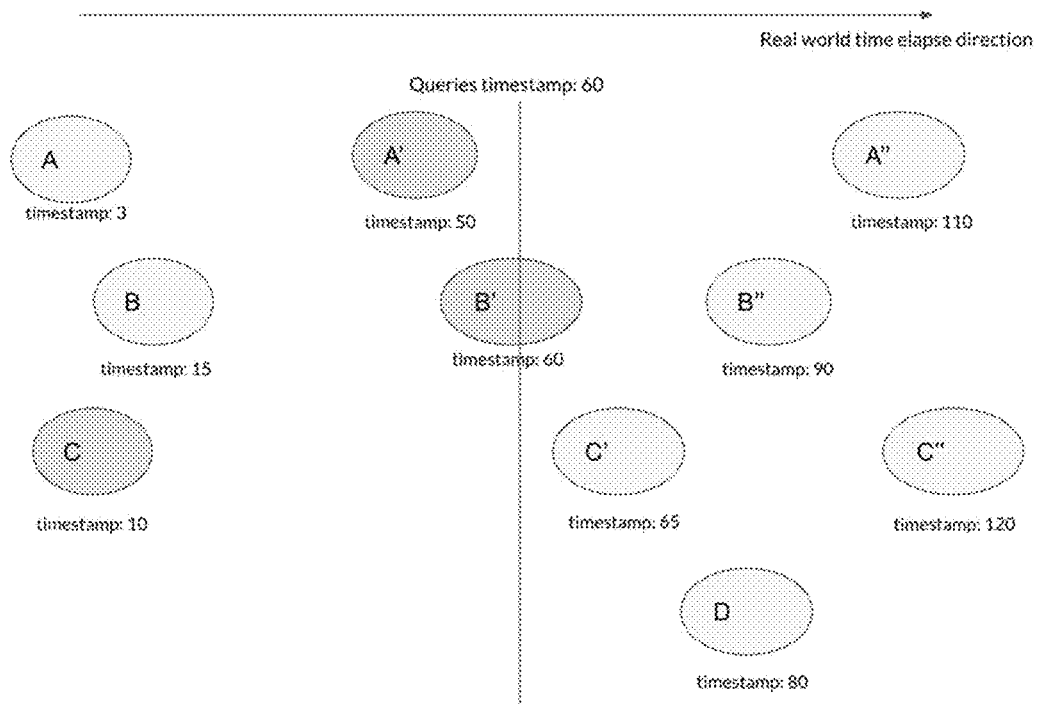
FIG. 25 is an illustration useful for describing graph time machine querying.

FIG. 25 is an illustration useful for describing graph time machine querying 2500. In FIG. 25, at the given timestamp 60, the A', B', and C are the vertices the end user sees in the logical graph snapshot. Any edges between these three vertices are the edges the end user sees in the logical graph snapshot.

Regarding massive parallel graph processing and storage engine integration, one possible abstract massive parallel graph processing engine provides two operators: VertexMap, EdgeMap. The signatures of the two operators are like:

VertexMap(Set<Vertex>vs, VertexFunction vFunc)
EdgeMap(Set<Vertex>sourceVs, EdgeFunction eFunc)
Where
VertexFunction(Vertex v)
EdgeFunction(Vertex source, Edge, Vertex target).

Figure 26:
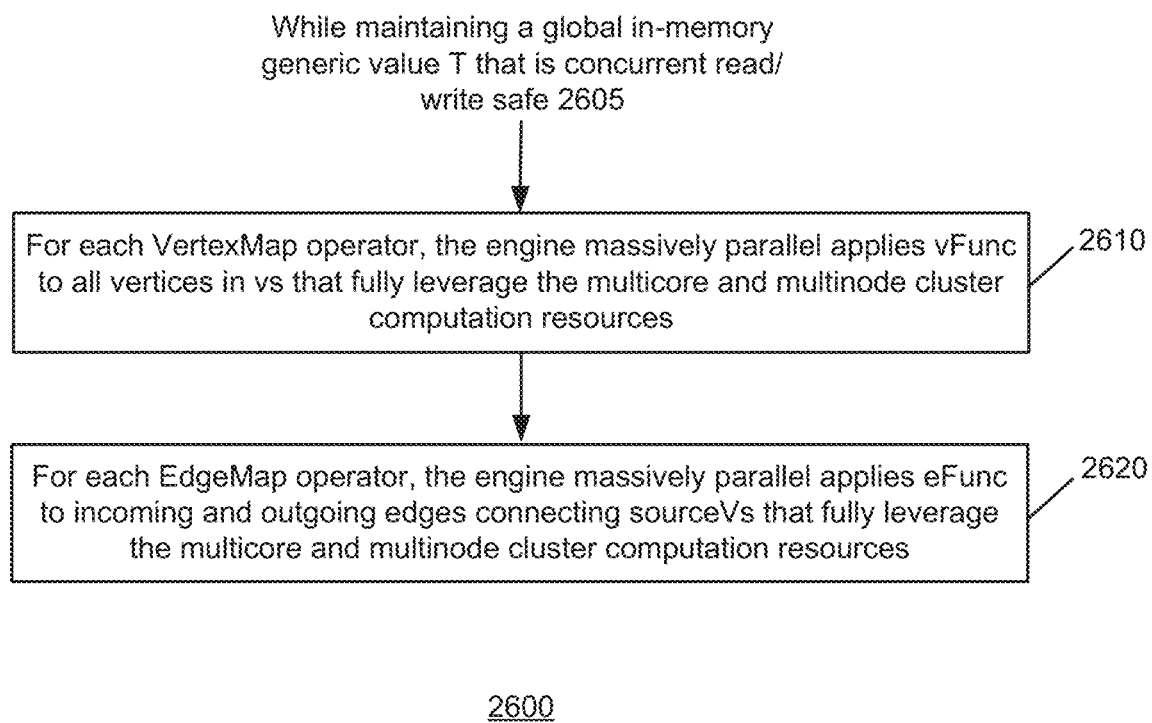
FIG. 26 is an operational flow of an embodiment of a method for graph processing.

FIG. 26 is an operational flow of an embodiment of a method 2600 for graph processing. In some implementations, the method 2600 may be implemented by the system 100.

As shown as 2605, the engine maintains a global in-memory generic value T that is concurrent read/write safe while 2610 and 2620 are performed.

At 2610, for each VertexMap operator, the engine massively parallel applies vFunc to all vertices in vs that fully leverage the multicore and multinode cluster computation resources.

At 2620, for each EdgeMap operator, the engine massively parallel applies eFunc to incoming and outgoing edges connecting sourceVs that fully leverage the multicore and multinode cluster computation resources.

Two example graph time machine queries are described that leverage the massive graph processing engine.

Figure 27:
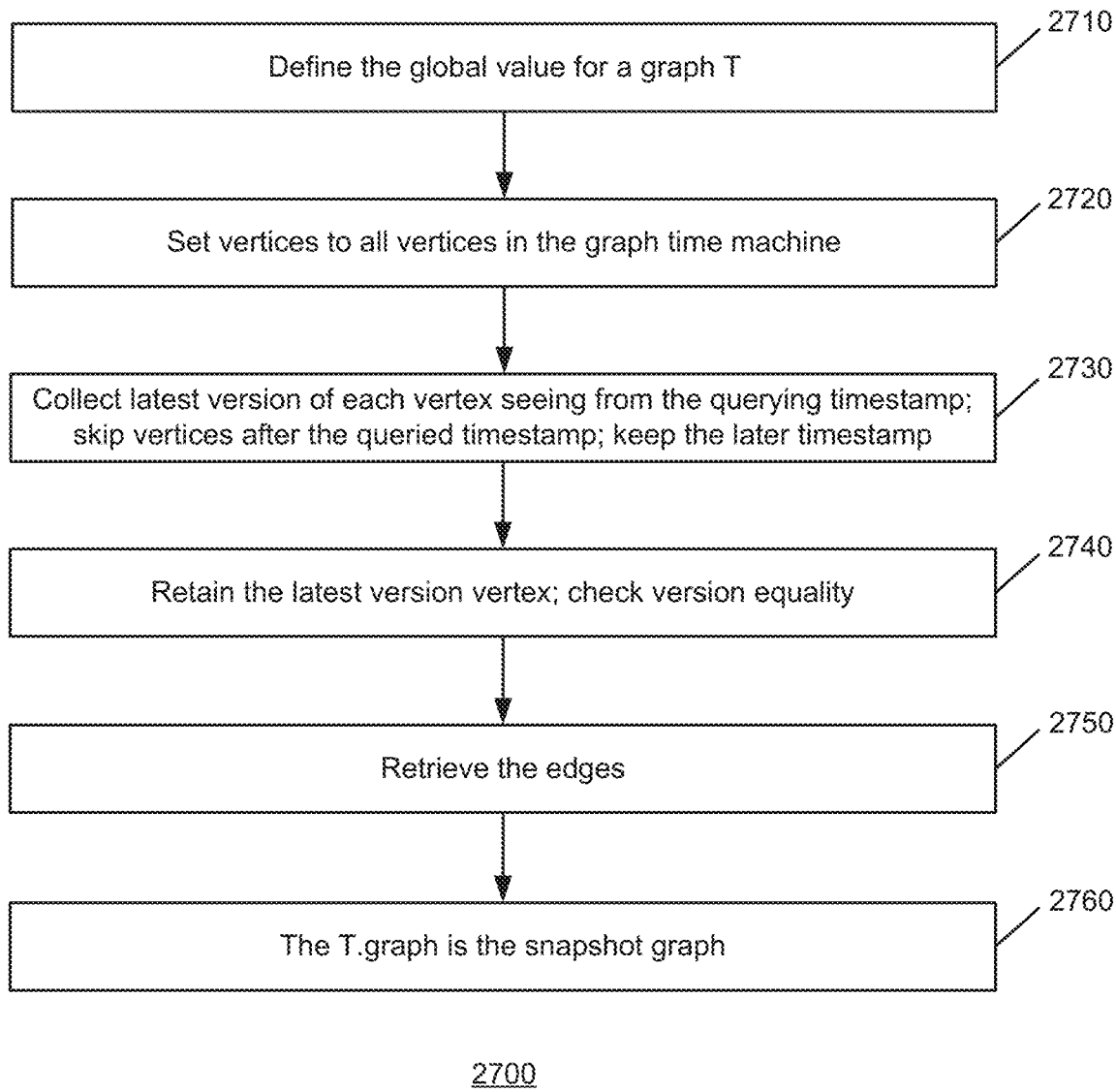
FIG. 27 is an operational flow of another embodiment of a method for graph processing.

FIG. 27 is an operational flow of another embodiment of a method 2700 for graph processing. In some implementations, the method 2700 may be implemented by the system 100. The method 2700 is directed to getting the snapshot of the whole graph at a given timestamp t.

At 2710, define the global value, as follows for example:

```
T = {
    Map<ID, epoch> latestVersion;
    Set<Vertex> temp;
    graph: {
        Set<Vertex> vertices;
        Set<Edge> edges;
    }
}
Then perform an engine runner function:
engineRun(epoch t) {
    // Start with all vertices in the graph time machine, at 2720
    Set<Vertex> vs = { All vertices in graph };
    // Collect the latest version of each vertex seeing from the querying timestamp, at 2730
    VertexMap(vs, (Vertex v) -> {
        // Skip vertices after the queried timestamp
        if (v.timestamp > t) {
            return;
        }
        T.temp.add(v);
        // Keep the later timestamp
        if (T.latestVersion.get(v.id) < v.timestamp) {
            T.latestVersion.set(v.id, v.timestamp);
        }
    });
    // Retain the latest version vertex, at 2740
    VertexMap(T.temp, (Vertex v) -> {
        // Check version equality
        if (T.latestVersion.get(v.id) == v.timestamp) {
            T.graph.vertices.add(v);
        }
    });
    // Retrieve the edges, at 2750
    EdgeMap(T.graph.vertices, (Vertex source, Edge edge, Vertex target) -> {
        if (T.graph.vertices.contains(target)) {
            T.graph.edges.add(v);
        }
    });
}
```

The T.graph is the snapshot graph, at 2760.

Figure 28:
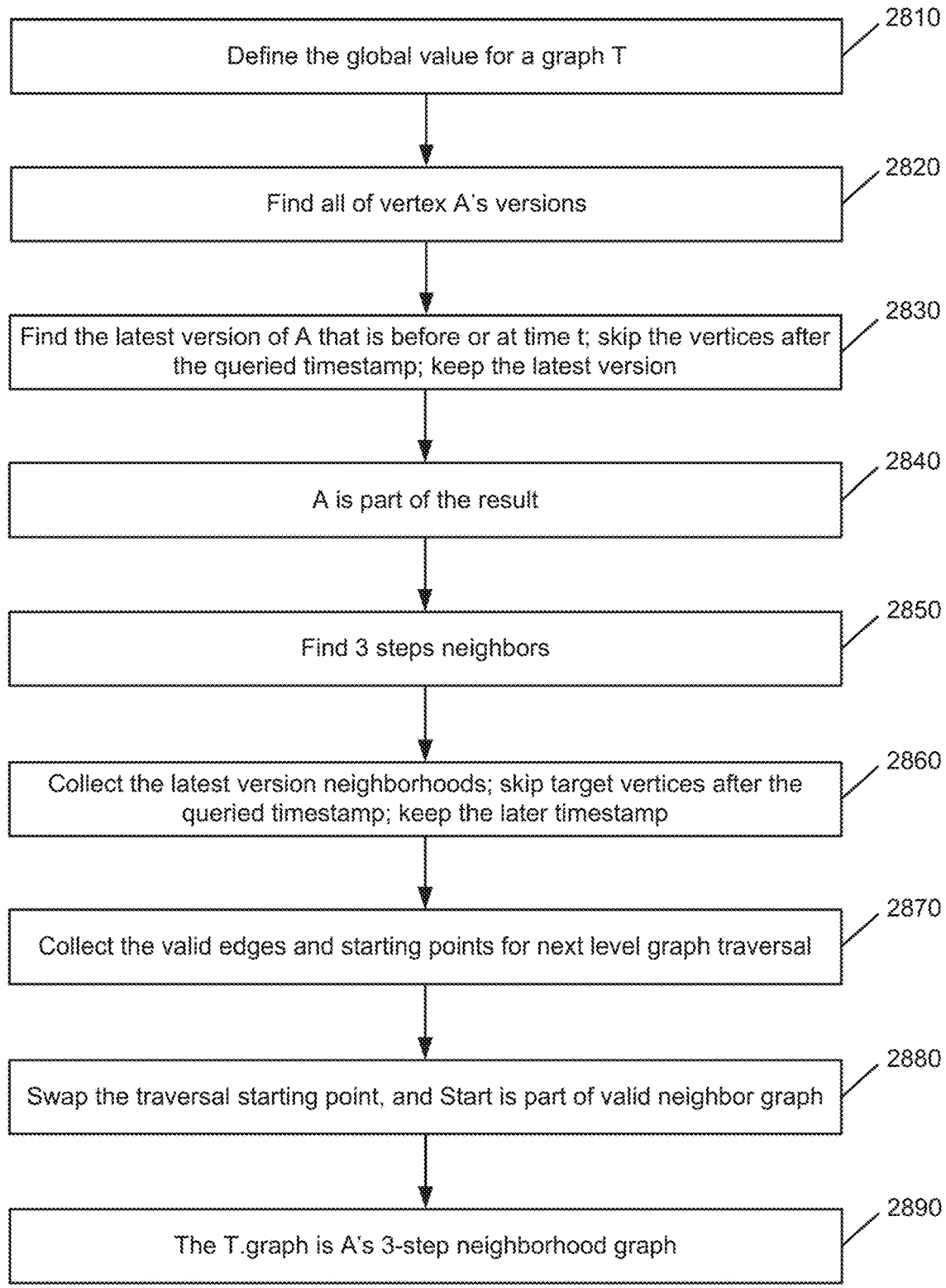
FIG. 28 is an operational flow of another embodiment of a method for graph processing.

FIG. 28 is an operational flow of another embodiment of a method 2800 for graph processing. The method 2800 is directed to getting the 3-step neighborhood subgraph of a given vertex A at timestamp t.

A native solution is first use the engine run function above to retrieve the whole graph snapshot, then query the snapshot graph. But retrieving the whole graph snapshot can be expensive, especially in the case that the whole graph is huge and the 3-step neighborhood subgraph is just a super small portion of the whole graph. A more optimized implementation is described.

At 2810, define the global value, as follows for example:

```
T = {
    Epoch At = -oo;
    Vertex Start;
    Map<ID, epoch> latestVersion;
    Set<Vertex> temp;
    graph: {
        Set<Vertex> vertices;
        Set<Edge> edges;
    }
}
Then perform an engine runner function:
engineRun(Vertex A, epoch t) {
    // Find all of A's versions, at 2820. Assume the engine can index the vertices by their ID.
    Set<Vertex> As = { All versions of A in graph };
    // Find the latest version of A that is before or at t, at 2830.
    VertexMap(As, (Vertex v) -> {
        // Skip vertices after the queried timestamp
        if (v.timestamp > t) {
            return;
        }
        // Keep the latest version
        if (At < v.timestamp) {
            At = v.timestamp;
            Start = v;
        }
    });
    // A is part of result, at 2840
    graph.vertices.add(Start);
    // Find 3 steps neighbors, at 2850
    for i in 1 .. 3 {
        T.latestVersion.clear( );
        T.temp.clear( );
        // Collect the latest version neighborhoods, at 2860
        EdgeMap(Start, (Vertex source, Edge edge, Vertex target) -> {
            // Skip target vertices after the queried timestamp
            if (target.timestamp > t) {
                return;
            }
            // Keep the later timestamp
            if (T.latestVersion.get(v.id) < v.timestamp) {
                T.latestVersion.set(v.id, v.timestamp);
            }
        });
        // Collect the valid edges and starting points for next level graph traversal, at 2870
        EdgeMap(Start, (Vertex source, Edge edge, Vertex target) -> {
            if (T.latestVersion.get(target.id) == target.timestamp) {
                // Skip the deleted vertex
                if (target.status == ACTIVE) {
                    // Edge is valid
                    T.graph.edges.add(edge);
                    // Collect non-traversed new vertices)
                    if (!T.graph.vertices.contains(target)) {
                        T.temp.add(target);
                    }
                }
            }
        });
        // Swap the traversal starting point, and also Start is part of valid neighbor graph, at 2880
        Start = T.temp;
        T.graph.vertices.add(... Start);
    }
}
```

The T.graph is A's 3-step neighborhood graph, at 2890.

FIG. 29 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 29, an exemplary system for implementing aspects described herein includes a computing device, such as computing device 2900. In its most basic configuration, computing device 2900 typically includes at least one processing unit 2902 and memory 2904. Depending on the exact configuration and type of computing device, memory 2904 may be volatile (such as RAM), non-volatile (such as ROM, flash memory, etc.), or some combination of the two. This most basic configuration is illustrated in FIG. 29 by dashed line 2906.

Computing device 2900 may have additional features/functionality. For example, computing device 2900 may include additional storage (removable and/or non-removable) including, but not limited to, magnetic or optical disks or tape. Such additional storage is illustrated in FIG. 29 by removable storage 2908 and non-removable storage 2910.

Computing device 2900 typically includes a variety of computer readable media. Computer readable media can be any available media that can be accessed by the device 2900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 2904, removable storage 2908, and non-removable storage 2910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 2900. Any such computer storage media may be part of computing device 2900.

Computing device 2900 may contain communication connection(s) 2912 that allow the device to communicate with other devices. Computing device 2900 may also have input device(s) 2914 such as a keyboard, mouse, pen, voice input device, touch input device, etc. Output device(s) 2916 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an embodiment, a method comprises receiving a graph update event for a temporal graph, wherein the temporal graph comprises a topology comprising at least one vertex and at least one edge, wherein each of the at least one vertex and at least one edge comprises at least one property respectively, wherein the topology and the at least one properties evolve with time; and updating the temporal graph using the graph update event, wherein updating the temporal graph comprises storing a delta change of graph evolution for each graph update event.

Embodiments may include some or all of the following features. The graph update event comprises at least one of a topology change or a property change of at least one vertex or at least one edge of the temporal graph. The graph update event comprises at least one of vertex created; vertex deleted; vertex property updated; edge created; edge deleted; or edge property updated. The method further comprises receiving, generating, or maintaining the temporal graph prior to receiving the graph update. The method further comprises receiving a query for the temporal graph; processing the query using the temporal graph; and outputting the results of the query processed using the temporal graph. The query is for a previous time in the temporal graph. Processing the query comprises performing the query on a snapshot of the graph at a previous point in time.

In an embodiment, a system comprises an event streaming injector configured to receive a graph update for a temporal graph, wherein the temporal graph comprises a topology comprising at least one vertex and at least one edge, wherein each of the at least one vertex and at least one edge comprises at least one property respectively, wherein the topology and the at least one properties evolve with time; a massive parallel graph processing engine configured to receive the graph update from the event streaming injector, process the graph update, and update the temporal graph, wherein updating the temporal graph comprises storing a delta change of graph evolution for the graph update; and a massive parallel graph storage engine configured to store an initial snapshot of a graph topology and properties of the temporal graph and delta changes at each time along as time elapses, and an event associated with each time when the temporal graph has an update.

Embodiments may include some or all of the following features. The massive parallel graph processing engine is further configured to receive a query and provide a temporal storage request to the massive parallel storage engine. The query is for a previous time in the temporal graph. The massive parallel graph storage engine is further configured to provide a temporal storage response to the massive parallel graph processing engine. The massive parallel graph processing engine is further configured to provide a query response as an output to a computing device, wherein the query response is based on a snapshot of the graph at a previous point in time. The massive parallel graph storage engine is further configured to receive an updated temporal graph from the massive parallel graph processing engine. The graph update comprises at least one of a topology change or a property change of at least one vertex or at least one edge of the temporal graph. The graph update comprises at least one of vertex created; vertex deleted; vertex property updated; edge created; edge deleted; or edge property updated.

In an embodiment, a system comprises at least one processor; and a non-transitory computer readable medium comprising instructions that, when executed by the at least one processor, cause the system to: receive a graph update event for a temporal graph, wherein the temporal graph comprises: a graph schema comprising a plurality of generic vertices, wherein each generic vertex is configured to hold historical versions of the vertex in the temporal graph; and a plurality of generic edges, wherein each generic edge is configured to hold a plurality of connections between the generic vertices; and update the temporal graph using the graph update event.

Embodiments may include some or all of the following features. Each generic vertex comprises: a timestamp property that holds a timestamp when a specific version of the vertex is created, an identifier, and a status indicator. Each generic vertex further comprises a version identifier, a label, and a properties indicator. Each generic edge comprises: information pertaining to the endpoints of the generic edge, an identifier, and an identifier indicating whether the generic edge is directed or undirected. Each generic edge further comprises an edge label and a properties indicator.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a graph update event for a temporal graph at a massive parallel graph processing engine, wherein the temporal graph comprises a topology comprising at least one vertex and at least one edge, wherein each of the at least one vertex and at least one edge comprises at least one property respectively, wherein the topology and the at least one properties evolve with time;
   updating the temporal graph using the graph update event, wherein updating the temporal graph comprises storing at a massive parallel graph storage engine a delta change of graph evolution for each graph update event;
   receiving a query for the temporal graph, wherein the query is for a previous time in the temporal graph;
   processing the query using the temporal graph, wherein processing the query comprises performing the query on a snapshot of the graph at a previous point in time; and
   outputting the results of the query processed using the temporal graph.

2. The method of claim 1, wherein the graph update event comprises at least one of a topology change or a property change of at least one vertex or at least one edge of the temporal graph.

3. The method of claim 1, wherein the graph update event comprises at least one of vertex created; vertex deleted; vertex property updated; edge created; edge deleted; or edge property updated.

4. The method of claim 1, further comprising receiving, generating, or maintaining the temporal graph prior to receiving the graph update.

5. A system comprising:
   a processor;
   a memory;
   an event streaming injector configured to receive a graph update for a temporal graph, wherein the temporal graph comprises a topology comprising at least one vertex and at least one edge, wherein each of the at least one vertex and at least one edge comprises at least one property respectively, wherein the topology and the at least one properties evolve with time;
   a massive parallel graph processing engine configured to receive the graph update from the event streaming injector, process the graph update, and update the temporal graph, wherein updating the temporal graph comprises storing a delta change of graph evolution for the graph update; and
   a massive parallel graph storage engine configured to store an initial snapshot of a graph topology and properties of the temporal graph and delta changes at each time along as time elapses, and an event associated with each time when the temporal graph has an update,
   wherein the massive parallel graph processing engine is further configured to receive a query and provide a temporal storage request to the massive parallel storage engine, wherein the query is for a previous time in the temporal graph, and is further configured to provide a query response as an output to a computing device, wherein the query response is based on a snapshot of the graph at a previous point in time.

6. The system of claim 5, wherein the massive parallel graph storage engine is further configured to provide a temporal storage response to the massive parallel graph processing engine.

7. The system of claim 5, wherein the massive parallel graph storage engine is further configured to receive an updated temporal graph from the massive parallel graph processing engine.

8. The system of claim 5, wherein the graph update comprises at least one of a topology change or a property change of at least one vertex or at least one edge of the temporal graph.

9. The system of claim 5, wherein the graph update comprises at least one of vertex created; vertex deleted; vertex property updated; edge created; edge deleted; or edge property updated.

10. A system comprising:
    at least one processor; and a non-transitory computer readable medium comprising instructions that, when executed by the at least one processor, cause the system to:

receive a graph update event for a temporal graph at a massive parallel graph processing engine, wherein the temporal graph comprises: a graph schema comprising a plurality of generic vertices, wherein each generic vertex is configured to hold historical versions of the vertex in the temporal graph; and a plurality of generic edges, wherein each generic edge is configured to hold a plurality of connections between the generic vertices;

update the temporal graph using the graph update event, wherein updating the temporal graph comprises storing at a massive parallel graph storage engine a delta change of graph evolution for each graph update event;

receive a query for the temporal graph, wherein the query is for a previous time in the temporal graph;

process the query using the temporal graph, wherein processing the query comprises performing the query on a snapshot of the graph at a previous point in time; and output the results of the query processed using the temporal graph.

11. The system of claim 10, wherein each generic vertex comprises: a timestamp property that holds a timestamp when a specific version of the vertex is created, an identifier, and a status indicator.

12. The system of claim 11, wherein each generic vertex further comprises a version identifier, a label, and a properties indicator.

13. The system of claim 10, wherein each generic edge comprises: information pertaining to the endpoints of the generic edge, an identifier, and an identifier indicating whether the generic edge is directed or undirected.

14. The system of claim 13, wherein each generic edge further comprises an edge label and a properties indicator.

* * * * *